(12) United States Patent
Yamanaka et al.

(10) Patent No.: US 11,859,289 B2
(45) Date of Patent: Jan. 2, 2024

(54) SN-BASED PLATED STEEL SHEET

(71) Applicant: NIPPON STEEL CORPORATION, Tokyo (JP)

(72) Inventors: Shintaro Yamanaka, Tokyo (JP); Shigeru Hirano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 70 days.

(21) Appl. No.: 17/772,079

(22) PCT Filed: Dec. 19, 2019

(86) PCT No.: PCT/JP2019/049820
§ 371 (c)(1),
(2) Date: Apr. 26, 2022

(87) PCT Pub. No.: WO2021/124510
PCT Pub. Date: Jun. 24, 2021

(65) Prior Publication Data
US 2022/0389590 A1    Dec. 8, 2022

(51) Int. Cl.
*C23C 28/00* (2006.01)
*B32B 15/04* (2006.01)
(Continued)

(52) U.S. Cl.
CPC ........ *C23C 28/3455* (2013.01); *C23C 28/322* (2013.01); *C25D 3/32* (2013.01);
(Continued)

(58) Field of Classification Search
CPC ........ B32B 15/04; C23C 28/3455; C25D 9/10
See application file for complete search history.

(56) References Cited

U.S. PATENT DOCUMENTS

| | | | |
|---|---|---|---|
| 4,999,258 | A | 3/1991 | Wake et al. |
| 2013/0130055 | A1 | 5/2013 | Miyamoto et al. |
| 2020/0399765 | A1 | 12/2020 | Yamanaka et al. |

FOREIGN PATENT DOCUMENTS

| | | |
|---|---|---|
| CN | 102812156 A | 12/2012 |
| JP | 63-290292 A | 11/1988 |

(Continued)

OTHER PUBLICATIONS

"Surface Analytical Chemistry Library; X-ray Photoelectron Spectroscopy" edited by Japan Society of Surface Science, Maruzen Publishing Co., Ltd., 1998, July, p. 83, total of 4 pages.

*Primary Examiner* — Adam Krupicka
(74) *Attorney, Agent, or Firm* — Birch, Stewart, Kolasch & Birch, LLP

(57) ABSTRACT

To provide a Sn-based plated steel sheet excellent in yellowing resistance, coating film adhesiveness, and sulfurization blackening resistance without performing the conventional chromate treatment.

A Sn-based plated steel sheet of the present invention includes: a steel sheet; a Sn-based plating layer located on at least one surface of the steel sheet; and a coating layer located on the Sn-based plating layer, wherein: the Sn-based plating layer contains 0.10 to 15.00 g/m² of Sn per side in terms of metal Sn; the coating layer contains a Zr oxide and a Mn oxide; a content of the Zr oxide is 0.20 to 50.00 mg/m² per side in terms of metal Zr; a content of the Mn oxide in terms of metal Mn is 0.01 to 0.50 times on a mass basis relative to the content of the Zr oxide in terms of metal Zr; and a depth position A where an element concentration of Mn is maximum is located on a side closer to a surface of the coating layer than a depth position B where an element concentration of Zr is maximum, and a distance in a depth (Continued)

direction between the depth position A and the depth position B is 2 nm or more in an element analysis in the depth direction by XPS.

7 Claims, 1 Drawing Sheet

(51) Int. Cl.
 *C25D 9/08* (2006.01)
 *C25D 3/32* (2006.01)
 *C25D 5/50* (2006.01)
 *B65D 65/42* (2006.01)
(52) U.S. Cl.
 CPC ............... *C25D 5/505* (2013.01); *C25D 9/08* (2013.01); *B32B 15/04* (2013.01); *B65D 65/42* (2013.01)

(56) References Cited

FOREIGN PATENT DOCUMENTS

| | | | |
|---|---|---|---|
| JP | 2004-60052 | A | 2/2004 |
| JP | 2007-284789 | A | 11/2007 |
| JP | 2009-249691 | A | 10/2009 |
| JP | 2010-13728 | A | 1/2010 |
| JP | 2011-174172 | A | 9/2011 |
| JP | 2015-180782 | A | 10/2015 |
| JP | 2018-12857 | A | 1/2018 |
| JP | WO2019/168179 | A1 | 9/2019 |
| WO | WO 2015/001598 | A1 | 1/2015 |

(VALUE IN TERMS OF SiO$_2$)

SN-BASED PLATED STEEL SHEET

TECHNICAL FIELD

The present invention relates to a Sn-based plated steel sheet.

BACKGROUND ART

A tin (Sn)-based plated steel sheet is well known as "tinplate" and widely used for purposes of cans such as a food can and a beverage can and for other purposes. This is because Sn is safe for the human body and beautiful metal. The Sn-based plated steel sheet is mainly manufactured by an electroplating method. This is because the electroplating method is more advantageous than the hot-dip plating method in order to control the use amount of Sn which is relatively expensive metal to a minimum amount. After plating or after being given beautiful metallic luster by the heating and melting treatment after plating, the Sn-based plated steel sheet is often subjected to chromate coating on a Sn-based plating layer by a chromate treatment (electrolytic treatment, immersion treatment, or the like) using a solution of hexavalent chromate. The effects of the chromate coating are the prevention of yellowing of an external appearance owing to the suppression of oxidation of the surface of the Sn-based plating layer, the prevention of deterioration in coating film adhesiveness due to the cohesive failure of a tin oxide when painted for use, the improvement in sulfurization blackening resistance and so on.

On the other hand, recently, it is required that a final product does not contain hexavalent chromium and the chromate treatment itself is not performed because of an increase in awareness to the environment and safety. However, a Sn-based plated steel sheet without the chromate coating yellows in external appearance due to the growth of the tin oxide, decreases in coating film adhesiveness, and decrease in sulfurization blackening resistance as stated above.

Therefore, there are some proposed Sn-based plated steel sheets subjected to a coating treatment in place of the chromate coating.

For example, the following Patent Document 1 proposes a tin-based plated steel sheet in which a chemical conversion coating containing P and Si is formed by a treatment using a chemical conversion treatment solution containing phosphate ions and a silane coupling agent.

The following Patent Document 2 proposes a tin-plated steel sheet having a conversion treatment coating containing Al and P and at least one kind selected from among Ni, Co, and Cu, and a reaction product layer with a silane coupling agent.

The following Patent Document 3 proposes a method for manufacturing a Sn plated steel sheet of plating Zn superimposed on a Sn plating and then heating the steel sheet until a Zn independent plating layer substantially vanishes.

The following Patent Document 4 proposes a steel sheet for container given a Zr coating on a surface treatment layer containing Sn, and the following Patent Document 5 proposes a steel sheet for container having a Zr chemical compound coating layer.

The following Patent Document 6 proposes a steel sheet for container having a base Ni layer, a Sn-based plating layer in an island shape, a conversion treatment layer containing a tin oxide and a tin phosphate, and a Zr containing coating layer.

The following Patent Document 7 proposes a steel sheet for container having a coating containing a tin oxide and Zr, Ti, and P on the surface of a tin plating layer. Patent Document 7 also proposes that an alternate electrolysis of alternately performing a cathode electrolytic treatment and an anode electrolytic treatment may be performed for forming the coating.

PRIOR ART DOCUMENT

Patent Document

Patent Document 1: Japanese Laid-open Patent Publication No. 2004-060052
Patent Document 2: Japanese Laid-open Patent Publication No. 2011-174172
Patent Document 3: Japanese Laid-open Patent Publication No. S63-290292
Patent Document 4: Japanese Laid-open Patent Publication No. 2007-284789
Patent Document 5: Japanese Laid-open Patent Publication No. 2010-013728
Patent Document 6: Japanese Laid-open Patent Publication No. 2009-249691
Patent Document 7: International Publication Pamphlet No. WO 2015/001598

Non-Patent Document

Non-Patent Document 1: "Surface Analytical Chemistry Library; X-ray Photoelectron Spectroscopy" edited by Japan Society of Surface Science, Maruzen Publishing Co., Ltd., 1998, July, P. 83

DISCLOSURE OF THE INVENTION

Problems to be Solved by the Invention

However, the Sn-based plated steel sheets and their manufacturing methods proposed in above Patent Document 1 to Patent Document 7 cannot sufficiently suppress the growth of the tin oxide over time, and have room for improvement in yellowing resistance, coating film adhesiveness, and sulfurization blackening resistance.

Hence, the present invention has been made in consideration of the above problem, and an object of the present invention is to provide a Sn-based plated steel sheet excellent in yellowing resistance, coating film adhesiveness, and sulfurization blackening resistance without performing the conventional chromate treatment.

Means for Solving the Problems

To solve the above problem, as a result of earnest research by the present inventions, it has been found that the formation of a coating layer containing a zirconium oxide and a manganese oxide on a surface of a Sn-based plated steel sheet can realize a Sn-based plated steel sheet more excellent in yellowing resistance, coating film adhesiveness, and sulfurization blackening resistance without performing the chromate treatment.

The summary of the present invention completed based on the above finding is as follows.

(1) A Sn-based plated steel sheet includes: a steel sheet; a Sn-based plating layer located on at least one surface of the steel sheet; and a coating layer located on the Sn-based plating layer, wherein: the Sn-based plating layer contains 0.10 g/m² or more and 15.00 g/m² or less of Sn per side in terms of metal Sn; the coating layer contains a zirconium oxide and a manganese oxide; a content of the zirconium oxide in the coating layer is 0.20 mg/m² or more and 50.00 mg/m² or less per side in terms of metal Zr; a content of the manganese oxide in terms of metal Mn in the coating layer is 0.01 times or more and 0.50 times or less on a mass basis relative to the content of the zirconium oxide in terms of metal Zr; and a depth position A where an element concentration of Mn existing as the manganese oxide is maximum is located on a side closer to a surface of the coating layer than a depth position B where an element concentration of Zr existing as the zirconium oxide is maximum, and a distance in a depth direction between the depth position A and the depth position B is 2 nm or more in an element analysis in the depth direction by X-ray photoelectron spectroscopy.

(2) The Sn-based plated steel sheet according to (1), wherein a mass of the zirconium oxide in the element analysis in the depth direction by the X-ray photoelectron spectroscopy is 0.01 times or less a mass of the manganese oxide in the element analysis in the depth direction by the X-ray photoelectron spectroscopy on the surface of the coating layer.

(3) The Sn-based plated steel sheet according to (1) or (2), wherein the distance in the depth direction between the depth position A and the depth position B is 4 nm or more.

(4) The Sn-based plated steel sheet according to any one of (1) to (3), wherein the content of the zirconium oxide in the coating layer is 1.00 mg/m² or more and 30.00 mg/m² or less per side in terms of metal Zr.

(5) The Sn-based plated steel sheet according to any one of (1) to (4), wherein the content of the zirconium oxide in the coating layer is 2.00 mg/m² or more and 10.00 mg/m² or less per side in terms of metal Zr.

(6) The Sn-based plated steel sheet according to any one of (1) to (5), wherein the content of the manganese oxide in terms of metal Mn in the coating layer is 0.05 times or more and 0.40 times or less on a mass basis relative to the content of the zirconium oxide in terms of metal Zr.

(7) The Sn-based plated steel sheet according to any one of (1) to (6), wherein the content of the manganese oxide in terms of metal Mn in the coating layer is 0.10 times or more and 0.20 times or less on a mass basis relative to the content of the zirconium oxide in terms of metal Zr.

Effect of the Invention

As explained above. according to the present invention, it is possible to provide a Sn-based plated steel sheet excellent in yellowing resistance, coating film adhesiveness, and sulfurization blackening resistance without performing the conventional chromate treatment.

EMBODIMENTS FOR CARRYING OUT THE INVENTION

Hereinafter, preferable embodiments of the present invention will be explained in detail.

Note that the term "step" in this description includes not only an independent step but also a step even if it cannot be clearly discriminated from other steps but if its desired object can be achieved. The term "steel sheet" in this description means a base material steel sheet (so-called plating substrate) being an object on which a Sn-based plating layer and a coating layer are to be formed.

Further, the present invention explained below relates to a Sn-based plated steel sheet widely used for purposes of cans such as a food can and a beverage can and for other purposes. More specifically, the present invention relates to a Sn-based plated steel sheet more excellent in yellowing resistance, coating film adhesiveness, and sulfurization blackening resistance without performing the conventional chromate treatment.

1. Sn-Based Plated Steel Sheet

Figure 1:
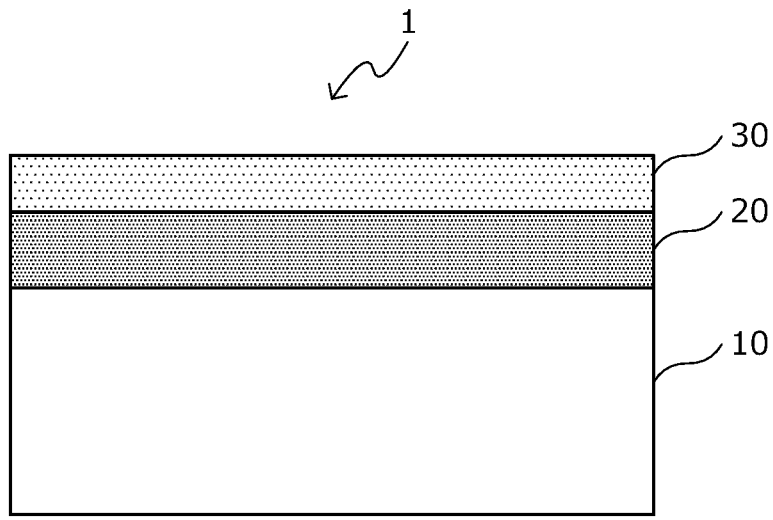
FIG. 1 is an explanatory view schematically illustrating an example of a structure of a Sn-based plated steel sheet according to an embodiment of the present invention.

First of all, a Sn-based plated steel sheet according to this embodiment will be explained referring to FIG. 1. FIG. 1 is an explanatory view schematically illustrating an example of a structure of the Sn-based plated steel sheet according to this embodiment.

As schematically illustrated in FIG. 1, a Sn-based plated steel sheet 1 according to this embodiment has a steel sheet (base material steel sheet) 10, a Sn-based plating layer 20 located on one surface of the steel sheet 10, and a coating layer 30 located on the Sn-based plating layer 20. The Sn-based plating layer 20 contains 0.10 g/m² or more and 15.00 g/m² or less of Sn per side in terms of metal Sn, and the coating layer 30 contains a zirconium oxide and a manganese oxide, a content of the zirconium oxide in the coating layer 30 being 0.20 mg/m² or more and 50.00 mg/m² or less per side in terms of metal Zr and a content of the manganese oxide in terms of metal Mn in the coating layer 30 being 0.01 times or more and 0.50 times or less on a mass basis relative to the content of the zirconium oxide in terms of metal Zr, a depth position A where the element concentration of Mn existing as the manganese oxide is maximum is located on the side closer to a surface of the coating layer than a depth position B where the element concentration of Zr existing as the zirconium oxide is maximum, and a distance in a depth direction between the depth position A and the depth position B is 2 nm or more in an element analysis in the depth direction by X-ray photoelectron spectroscopy.

(1. 1 Steel Sheet)

The steel sheet 10 used as a base material of the Sn-based plated steel sheet 1 according to this embodiment is not particularly prescribed, but any steel sheet can be used as long as it is a general steel sheet used for a Sn-based plated steel sheet for a container. Examples of the steel sheet 10 include low-carbon steel and ultralow carbon steel.

(1. 2 Sn-Based Plating Layer 20)

Sn-based plating is performed on at least one side of the above steel sheet 10 to produce the Sn-based plating layer 20. By the Sn-based plating layer 20, the corrosion resistance of the steel sheet 10 improves. Note that the "Sn-based plating layer" in this description includes not only plating with metal Sn but also a Sn-based plating layer containing an alloy of metal Sn and metal Fe, metal Ni, and at least one of a trace element other than metal Sn and impurities.

In the Sn-based plating layer 20 according to this embodiment, the Sn content per side is 0.10 g/m$^2$ or more and 15.00 g/m$^2$ or less as a metal Sn amount (namely, amount in terms of metal Sn). In the case where the content per side in the Sn-based plating layer 20 is less than 0.10 g/m$^2$ in metal Sn amount, the Sn-based plating layer 20 is unfavorably inferior in corrosion resistance. The content of Sn per side is preferably 1.0 g/m$^2$ or more in metal Sn amount. On the other hand, in the case where the content per side in the Sn-based plating layer 20 is more than 15.00 g/m$^2$ in metal Sn amount, the effect of improving the corrosion resistance by metal Sn is sufficient, and more increase is not preferable from the economical viewpoint. Further, the coating film adhesiveness also tends to decrease. The content of Sn per side is preferably 13.00 g/m$^2$ or less in metal Sn amount.

Here, the metal Sn amount in the Sn-based plating layer (namely, the Sn content per side in the Sn-based plating layer) is, for example, a value measured by the electrolytic method described in JIS G 3303 or the X-ray fluorescence method. Alternatively, the metal Sn amount in the Sn-based plating layer can also be found, for example, by the following method. A test piece with no coating layer formed thereon is prepared. The test piece is immersed in 10% nitric acid to dissolve the Sn-based plating layer, and Sn in the obtained solution is found by ICP emission spectrometry (high-frequency inductively coupled plasma emission spectrometry) using, for example, 799ce manufactured by Agilent Technologies Japan, Ltd. (using Ar as a carrier gas) as an apparatus. Then, based on an intensity signal obtained by the analysis, a calibration curve created from a solution having a known concentration, and an area where the Sn-based plating layer is formed on the test piece, the metal Sn amount can be found. Alternatively, in the case of a test piece with a coating layer formed thereon, the metal Sn amount can be found by a calibration curve method using GDS (glow discharge spectrometry), and the method is, for example, as follows. A plating sample having a known metal Sn amount (authentic sample) is used to find a relation between an intensity signal of the metal Sn in the authentic sample and a sputter rate by GDS and create a calibration curve in advance. Based on the calibration curve, the amount of metal Sn can be found from the intensity signal of a test piece having an unknown metal Sn amount and the sputter rate. Here, the Sn-based plating layer is defined as a portion from a depth where the intensity signal of Zr becomes ½ of the maximum value of the intensity signal of Zr to a depth where the intensity signal of Fe becomes ½ of the maximum value of the intensity signal of Fe when analyzing the Sn-based plating layer in a depth direction from the surface. From the viewpoint of the measurement precision and the swiftness, the measurement by the X-ray fluorescence method is preferable in terms of industry.

(1. 3 Coating Layer 30)

As explained above, on the Sn-based plating layer 20, the coating layer 30 is formed which contains the zirconium oxide and the manganese oxide. The Sn-based plated steel sheet 1 according to this embodiment has the coating layer 30 in which the zirconium oxide and the manganese oxide as in the above coexist in a later-explained quantitative relationship on the surface of the Sn-based plating layer 20 and thereby can further improve the yellowing resistance, the coating film adhesiveness, and the sulfurization blackening resistance. Note that a coating layer composed of only the zirconium oxide or the manganese oxide cannot sufficiently improve the yellowing resistance, the coating film adhesiveness, and the sulfurization blackening resistance. The reason for this is not exactly known but is considered as follows from the detailed research by the present inventors.

A tin oxide exists on the surface of the conventional Sn-based plating layer, and an increase in tin oxide amount over time decreases the yellowing resistance and the coating film adhesiveness and also decreases the sulfurization blackening resistance.

When a coating not containing the manganese oxide but containing the zirconium oxide exists on the surface of the Sn-based plating layer, an increase rate of the tin oxide over time tends to be suppressed due to the barrier property of the zirconium oxide layer itself. However, in terms of manufacturing step, the coating layer having the zirconium oxide is a heterogeneous coating containing a tin oxide, so that oxygen and sulfur permeate finely cracked portions existing in the fragile tin oxide and reach the Sn-based plating surface to gradually increase a tin oxide and a tin sulfide.

On the other hand, when a coating not containing the zirconium oxide but containing the manganese oxide exists on the surface of the Sn-based plating layer, the coating film adhesiveness decreases because the adhesiveness between the manganese oxide and the Sn-based plating is insufficient.

However, when the coating layer 30 containing both the zirconium oxide and the manganese oxide exists on the surface of the Sn-based plating layer 20, the tin oxide contained in the coating layer 30 is reduced by the manganese oxide, so that the tin oxide is decreased. Further, when the manganese oxide becomes an oxide having a higher oxidation number, a coating higher in barrier property is formed to suppress the permeation of oxygen and sulfur and thereby decrease the generation of the tin oxide and the tin sulfide. As a result, the yellowing resistance and the coating film adhesiveness are improved, and the sulfurization blackening resistance is also improved.

To realize the above effect, 0.20 mg/m$^2$ or more and 50.00 mg/m$^2$ or less of the zirconium oxide in metal Zr amount per side is necessary in the coating layer 30. When the content of the zirconium oxide is less than 0.20 mg/m$^2$ in metal Zr amount, the barrier property of the zirconium oxide is insufficient, so that the yellowing resistance, the coating film adhesiveness, and the sulfurization blackening resistance are not improved. The content of the zirconium oxide per side is preferably 1.00 mg/m$^2$ or more and more preferably 2.00 mg/m$^2$ or more in metal Zr amount. On the other hand, when the content of the zirconium oxide per side is more than 50.00 mg/m$^2$ in metal Zr amount, the coating film adhesiveness deteriorates because the zirconium oxide is excessive. The content of the zirconium oxide per side is preferably 30.00 mg/m$^2$ or less and more preferably 10.00 mg/m$^2$ or less in metal Zr amount.

Further, to realize the above effect, it is further required that the content of the manganese oxide in terms of metal Mn in the coating layer 30 is 0.01 times or more and 0.50 times or less on a mass basis relative to the content of the zirconium oxide in terms of metal Zr. When the amount of the manganese oxide per side is less than ¹⁄₁₀₀ in metal Mn amount relative to the content of the zirconium oxide in terms of metal Zr, the reduction of the tin oxide contained in the coating and further oxidation of the manganese oxide are insufficient, so that the yellowing resistance, the coating film adhesiveness, and the sulfurization blackening resistance cannot be sufficiently improved. The content of the manganese oxide in terms of metal Mn in the coating layer 30 is preferably 0.05 times or more and more preferably 0.10 times or more on a mass basis relative to the content of the zirconium oxide in terms of metal Zr. On the other hand, when the amount of the manganese oxide per side is more than ½ in metal Mn amount relative to the content of the zirconium oxide in terms of metal Zr, the manganese oxide is excessive to tend to cause embrittlement, resulting in deteriorated coating film adhesiveness. The content of the manganese oxide in terms of metal Mn in the coating layer 30 is preferably 0.40 times or less and more preferably 0.20 times or less on a mass basis relative to the content of the zirconium oxide in terms of metal Zr.

Further, in the coating layer 30, the manganese oxide needs to be thickened on the surface side of the coating layer 30 (namely, the manganese oxide concentration near the surface of the coating layer 30 is higher than the manganese oxide concentration near the interface of the coating layer 30 with the Sn-based plating layer 20).

Thus, the barrier property owing to the manganese oxide is sufficiently exhibited to further improve the yellowing resistance, the sulfurization blackening resistance, and the post-coating corrosion resistance. Further, because the amount of the manganese oxide is little at the interface between the coating layer 30 and the Sn-based plating layer 20, the coating film adhesiveness is further improved as well.

As the above state, specifically, it is necessary, for example, that the depth position A where the element concentration of Mn existing as the manganese oxide is maximum (in other words, the position where the detection intensity of the Mn element is maximum) is located on the side closer to the surface of the coating layer 30 than the depth position B where the element concentration of Zr existing as the zirconium oxide is maximum (in other words, the position where the detection intensity of the Zr element is maximum), and a distance in the depth direction between the depth position A and the depth position B is 2 nm or more when analyzing the coating layer 30 in the depth direction by X-ray photoelectron spectroscopy (XPS).

Figure 2:
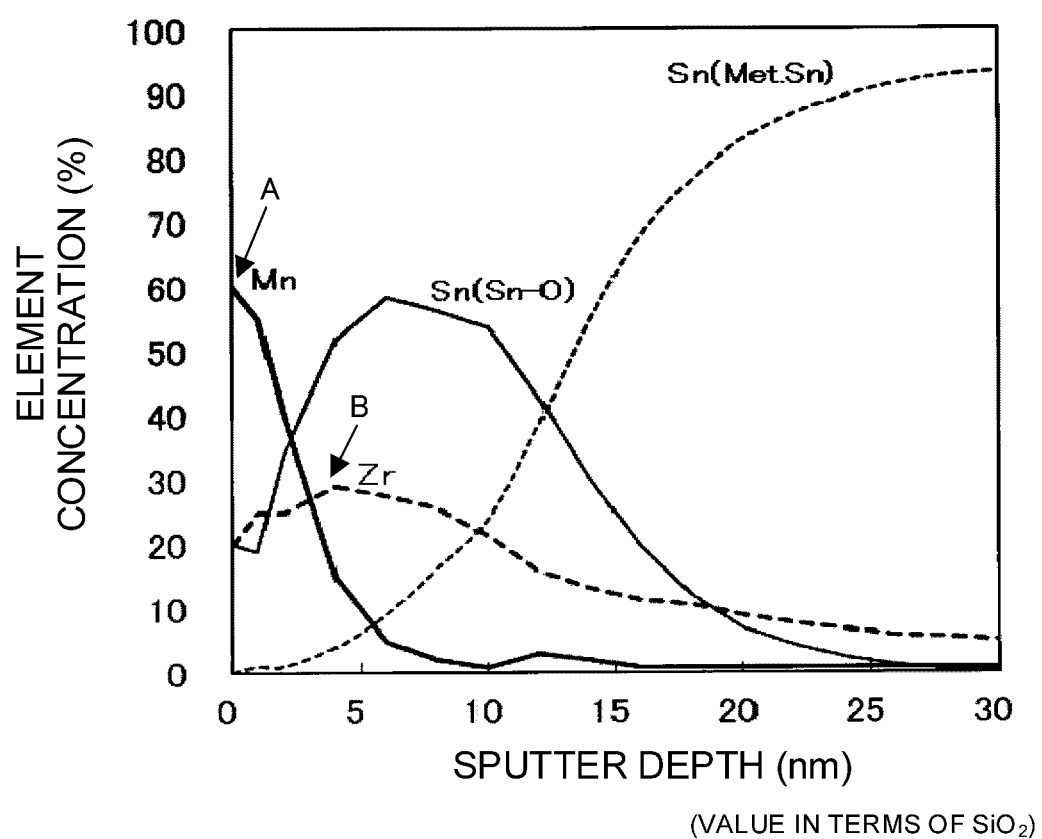
FIG. 2 illustrates examples of element concentration profiles in a thickness direction (depth direction) of the Sn-based plating layer and a coating layer of the Sn-based plated steel sheet measured by X-ray photoelectron spectroscopy according to one embodiment of the present invention.

FIG. 2 is a chart illustrating examples of element concentration profiles in the thickness direction (depth direction) of the Sn-based plating layer 20 and the coating layer 30 of the Sn-based plated steel sheet 1 according to this embodiment. The element concentration profiles illustrated in FIG. 2 are obtained by measuring the distributions of element concentrations from the surface of the coating layer 30 to the surface of the steel sheet 10 through the Sn-based plating layer 20 by the analysis in the depth by XPS. In FIG. 2, a position of 0 in "sputter depth" on the horizontal axis is the surface of the coating layer 30. The value of the "sputter depth" in FIG. 2 is synonymous with the "depth direction".

In the example illustrated in FIG. 2, the depth position A is a position of a sputter depth of 0 nm, and the depth position B is a position of a sputter depth of 4.0 nm. Explaining the example in FIG. 2 in line with FIG. 1, the depth position A is located on the surface of the coating layer 30 (upper surface of the coating layer 30 in FIG. 1), and the depth position B is located at a position separated by 4 nm in the depth direction from the surface of the coating layer 30 (position separated by 4 nm downward from the upper surface of the coating layer 30 in FIG. 1). In other words, in the example illustrated in FIG. 2, the distance in the depth direction between A and B is 4 nm.

In this case, generally, the manganese oxide exists more, on a mass basis, than the zirconium oxide on the surface side of the coating layer 30 containing the zirconium oxide and the manganese oxide. The separation by 2 nm or more between the depth positions A and B in the depth direction means that the manganese oxide is thickened more than the zirconium oxide on the surface side of the coating layer 30. Therefore, the manganese oxide thickened on the surface of the coating layer 30 becomes an oxide having a higher oxidation number, resulting in a coating high in barrier property. The coating composed of the manganese oxide suppresses the permeation of oxygen and sulfur to suppress the generation of a tin oxide and a tin sulfide in the Sn-based plating layer. This improves the yellowing resistance and the coating film adhesiveness in the Sn-based plating layer and also improves the sulfurization blackening resistance.

Note that the depth position A where the element concentration of Mn existing as the manganese oxide is maximum is preferably located on the side closer to the surface of the coating layer by 4 nm or more than the depth position B where the element concentration of Zr existing as the zirconium oxide is maximum. When these depth positions are separated by 4 nm or more, the thickening of the manganese oxide on the surface of the coating layer 30 is remarkable, so that the coating composed of the manganese oxide further exhibits the barrier function. Here, the upper limit value of the separation distance between the depth positions is not particularly prescribed but is more preferable as they are further separated, and an actual upper limit value is about 15 nm.

The distributions of the zirconium oxide and the manganese oxide in the coating layer 30 can be identified and quantified by analyzing the coating layer 30 from the surface side by X-ray photoelectron spectroscopy (XPS). Specifically, the zirconium oxide in the coating layer 30 is identified based on the peak of a binding energy of Zr 3d5/2 located at a position separated by 3.0 eV or more and 4.0 eV or less to the high energy side from the peak position of the binding energy of metal Zr in the element concentration profile obtained by the X-ray photoelectron spectroscopy. Besides, the manganese oxide in the coating layer 30 is identified based on the peak of a binding energy of Mn 2p3/2 existing separated by 1.5 eV or more and 3.5 eV or less to the high energy side from the peak position of the binding energy of metal Mn in the element concentration profile obtained by the X-ray photoelectron spectroscopy.

Note that the above Zr 3d5/2 or Mn 2p3/2 represents an energy level of electrons in Zr or Mn, and is interpreted similarly to, for example, the expression of the energy level of electrons in Sn as described in P 83 of Non-Patent Document 1.

Here, if "the peak of a binding energy of Zr 3d5/2 located at a position separated by 3.0 eV or more and 4.0 eV or less to the high energy side from the peak position of the binding energy of metal Zr" regarding the zirconium oxide and "the peak of a binding energy of Mn 2p3/2 existing separated by 1.5 eV or more and 3.5 eV or less to the high energy side from the peak position of the binding energy of metal Mn" regarding the manganese oxide are measured by the above-explained measurement method, there is no problem even if the coating layer 30 contains a zirconium oxide and a manganese oxide having other structures or a compound other than the oxides.

As illustrated in FIG. 2, it is found that the Sn-based plated steel sheet 1 according to this embodiment has the coating layer 30, in which the zirconium oxide and the manganese oxide coexist, existing on the surface of the Sn-based plating layer 20 containing metal Sn.

Note that the coating layer 30 containing the zirconium oxide and the manganese oxide may be in a mixed state of them or may be a solid solution of the oxides regardless of its presence state. Besides, there is no problem even if the coating layer 30 contains any element such as Fe, Ni, Cr, Ca, Na, Mg, Al, Si or the like.

In the coating layer 30, the content of the zirconium oxide (metal Zr amount) and the content of the manganese oxide (metal Mn amount) are set to values obtained by immersing and dissolving the Sn-based plated steel sheet 1 according to this embodiment, for example, in an acid solution such as hydrofluoric acid and sulfuric acid and measuring the obtained solution by a chemical analysis such as a high-frequency inductively coupled plasma (ICP) emission spectrometry. Alternatively, the content of the zirconium oxide (metal Zr amount) and the content of the manganese oxide (metal Mn amount) in the coating layer 30 may be obtained by the X-ray fluorescence measurement. From the viewpoints of the measurement precision and the swiftness, the measurement by the X-ray fluorescence method is preferable in terms of industry.

The above-explained Sn-based plated steel sheet 1 according to this embodiment has the coating layer 30 containing predetermined amounts of the zirconium oxide and the manganese oxide on the Sn-based plating layer 20. Further, the content of the manganese oxide in the coating layer 30 falls within a predetermined range with respect to the content of the zirconium oxide, and the depth position A where the element concentration of Mn existing as the manganese oxide is maximum is located on the side closer to the surface of the coating layer 30 than the depth position B where the element concentration of Zr existing as the zirconium oxide is maximum, and the distance in the depth direction between the depth position A and the depth position B is 2 nm or more in the element analysis in the depth direction by XPS. Therefore, the manganese oxide reduces the tin oxide existing near the coating layer 30 to decrease the tin oxide, whereas the manganese oxide becomes an oxide having a higher oxidation number to form a coating high in barrier property to thereby suppress permeation of oxygen and sulfur. In conjunction with the barrier property owing to the zirconium oxide in the coating layer 30, the generation of the tin oxide and the tin sulfide is decreased to improve the yellowing resistance and the coating film adhesiveness and also improve the sulfurization blackening resistance.

Further, the Sn-based plated steel sheet 1 according to this embodiment has no problem even if a publicly-known coating is formed on the surface of the Sn-based plated steel sheet having the Sn-based plating layer 20 and the coating layer 30 as explained above. Examples of the coating include various conversion treatment coatings made of a P-based compound and an Al-based compound. However, it is preferable that the Sn-based plated steel sheet 1 according to this embodiment has not been subjected to a chromate treatment. Accordingly, it is preferable that the Sn-based plated steel sheet 1 according to this embodiment has no chromate layer.

Furthermore, the Sn-based plated steel sheet 1 has been explained as having the Sn-based plating layer 20 only one side, but the present invention is not limited to this. For example, the Sn-based plated steel sheet 1 may have the Sn-based plating layers 20 on both sides. In this case, the above-explained coating layer 30 may be provided only on at least one of the Sn-based plating layers 20. Further, the Sn-based plated steel sheet 1 may have the Sn-based plating layer 20 on one side and have every kind of coating other than the Sn-based plating layer 20 on the other side.

2. Method for Manufacturing the Sn-Based Plated Steel Sheet

The Sn-based plated steel sheet according to this embodiment may be manufactured by any method, and can be manufactured, for example, by a method for manufacturing a Sn-based plated steel sheet explained below.

The method for manufacturing the Sn-based plated steel sheet 1 according to this embodiment includes a step of forming the Sn-based plating layer 20 on at least one surface of the steel sheet 10, and a step of forming the coating layer 30 containing the zirconium oxide and the manganese oxide on the Sn-based plating layer 20. The method will be explained below in detail.

(2. 1 Preparation of a Steel Sheet)

First of all, a steel sheet 10 being a base material of the Sn-based plated steel sheet 1 is prepared. The manufacturing method and the material for the steel sheet to be used are not particularly prescribed but, for example, the one manufactured through steps of hot rolling, acid cleaning, cold rolling, annealing, temper rolling and so on starting from casting can be used.

(2. 2 Formation of the Sn-Based Plating Layer)

Next, a Sn-based plating layer (Sn plating) is formed at least one surface of the steel sheet. A method of applying the Sn plating on the surface of the steel sheet is not particularly prescribed, but a publicly-known electroplating method. As the electroplating method, for example, an electrolytic method using a well-known ferrostan bath, halogen bath, or alkali bath can be used. Note that a melting method of applying Sn-based plating by immersing the steel sheet in molten Sn may be used.

Further, after the Sn-based plating, a heating and melting treatment of heating the steel sheet having the Sn-based plating layer to equal to or higher than 231.9° C. that is the melting point of Sn may be performed. By the heating and melting treatment, the surface of the Sn-based plating layer takes a polish and an alloy layer of Sn and Fe is formed between the Sn-based plating layer and the steel sheet to further improve the corrosion resistance and adhesiveness.

(2. 3 Formation of the Coating Layer)

Next, a coating layer containing the zirconium oxide and the manganese oxide is formed on at least a part of the surface of the Sn-based plating layer. Thus, the Sn-based plated steel sheet according to this embodiment can be obtained.

The coating layer containing the zirconium oxide and the manganese oxide can be formed on the surface of the Sn-based plating layer by performing an immersion treatment on the Sn-based plated steel sheet in an immersion bath containing zirconium ions and manganese ions or by performing a cathode electrolytic treatment in a cathode electrolytic solution containing zirconium ions and manganese ions. However, in the immersion treatment, a coating layer containing the zirconium oxide and the manganese oxide is formed by etching the surface of the Sn-based plating layer being a base. Therefore, the adhesion amount of the Sn-based plating layer is likely to become uneven and the treatment time also becomes long, so that the immersion treatment is disadvantageous in terms of industry. On the other hand, in the cathode electrolytic treatment, a uniform coating can be obtained owing to the forcible movement of charges and the surface cleaning by the generation of hydrogen at the interface of the steel sheet in conjunction with the adhesion promoting effect by an increase in pH. Further, the cathode electrolytic treatment can be performed in a short time such as about several seconds to several tens of seconds owing to the coexistence of the nitrate ions and ammonium ions in the cathode electrolytic solution. Therefore, the cathode electrolytic treatment is extremely advantageous in terms of industry.

Therefore, it is preferable to use a method by the cathode electrolytic treatment for the formation of the coating layer containing the zirconium oxide and the manganese oxide.

The concentration of the zirconium ions in the cathode electrolytic solution for performing the cathode electrolytic treatment only needs to be adjusted as needed according to the production facility, production rate (ability), and so on. For example, the concentration of the zirconium ions is preferably 100 ppm or more and 4000 ppm or less. The concentration of the manganese ions is preferably set to 0.07 times or more and 2.50 times or less the zirconium ion concentration. The concentration of the manganese ions is set to the above range to form the coating layer such that an adhesion amount of the zirconium oxide (metal Zr) falls within the above range, whereby the adhesion amount of the manganese oxide (metal Mn) also falls within the above range.

Further, there is no problem even if other components such as fluorine ions, ammonium ions, nitrate ions, sulfate ions, and chloride ions are contained in the solution containing the zirconium ions and the manganese ions.

As a supply source of the zirconium ions in the cathode electrolytic solution, for example, a zirconium complex such as $H_2ZrF_6$ can be used. Zr in the above Zr complex becomes $Zr^{4+}$ due to the increase in pH at the cathode electrode interface and exists in the cathode electrolytic solution. The zirconium ions further react in the cathode electrolytic solution to become a zirconium oxide. Examples of the supply source of the manganese ions include manganese sulfate, manganese nitrate, manganese chloride and so on.

Further, as the solvent of the cathode electrolytic solution when performing the cathode electrolytic treatment, for example, water such as distilled water can be used. However, the solvent is not limited to water such as distilled water but can be appropriately selected according to the material to be dissolved, the forming method or the like.

Note that to adjust pH and to increase the electrolysis efficiency of the cathode electrolytic solution, for example, nitric acid, ammonia water or the like may be added into the cathode electrolytic solution.

Here, the solution temperature of the cathode electrolytic solution when performing the cathode electrolytic treatment is not particularly prescribed, but is preferably set to, for example, a range of 10° C. or higher and 50° C. or lower. Performing the cathode electrolysis at 50° C. or lower enables the formation of the structure of the coating layer which is formed of extremely fine particles and is dense and uniform. On the other hand, when the solution temperature is lower than 10° C., the forming efficiency of the coating is low and the cooling of the solution is thus needed when the outside air temperature is high as in summer, which is not only uneconomical but also may deteriorate the sulfurization blackening resistance depending on the composition of the cathode electrolytic solution. Besides, when the solution temperature is higher than 50° C., the coating to be formed is nonuniform depending on the composition of the cathode electrolytic solution, so that defects, cracks, microcracks or the like occur to make the formation of the dense coating difficult, and may cause a starting point of corrosion or the like.

Besides, the pH of the cathode electrolytic solution is not particularly prescribed, but is preferably set to 3.0 or higher and 5.0 or lower. When the pH is lower than 3.0, the generation efficiency of the coating may decrease depending on other conditions of the cathode electrolytic treatment, whereas when the pH is higher than 5.0, a large amount of deposition occurs in the cathode electrolytic solution depending on the composition of the cathode electrolytic solution to deteriorate the continuous productivity.

Besides, the current density when performing the cathode electrolytic treatment is preferably set to, for example, 0.05 $A/dm^2$ or more and 50.00 $A/dm^2$ or less. When the current density is less than 0.05 $A/dm^2$, the forming efficiency of the coating may be decreased depending on other conditions of the cathode electrolytic treatment to cause a sparse coating, thereby deteriorating the yellowing resistance and the sulfurization blackening resistance. When the current density is more than 50.00 $A/dm^2$, the hydrogen production may become excessive depending on other conditions of the cathode electrolytic treatment to form coarse zirconium oxide and manganese oxide, thereby deteriorating the yellowing resistance, the coating film adhesiveness, and the sulfurization blackening resistance. A more preferable range of the current density is 1.00 $A/dm^2$ or more and 10.00 $A/dm^2$ or less.

Note that, when forming the coating layer, the time of the cathode electrolytic treatment is not particularly limited. The time of the cathode electrolytic treatment only needs to be adjusted according to the current density with respect to the content (metal Zr amount) of the zirconium oxide in the target coating layer. Further, there is no problem even if the energization pattern when performing the cathode electrolytic treatment is continuous energization or intermittent energization.

Besides, it is necessary to perform water washing by immersion treatment or spray treatment for 2 to 10 seconds after the cathode electrolytic treatment in order that the peak position where the detection intensity of the manganese oxide is maximum exists on the side closer to the surface layer of the coating layer by 2 nm or more than the peak position where the detection intensity of the zirconium oxide is maximum when analyzing the coating layer in the depth direction by the X-ray photoelectron spectroscopy.

This water washing makes the peak position where the detection intensity of the manganese oxide is maximum likely to exist on the side closer to the surface of the coating layer than the peak position where the detection intensity of the zirconium oxide is maximum. As for this mechanism, it is estimated that sufficient water washing removal of the cathode electrolytic solution with a low pH after the cathode electrolysis suppresses the dissolution of the Mn oxide deposited on the surface of the coating layer into the cathode electrolytic solution adhering to the coating layer. It is further estimated that the water washing provides an effect of removing the zirconium oxide adhering to the surface of the coating layer. A water washing time of shorter than 2 seconds is insufficient to thicken Mn on the surface of the coating layer. On the other hand, a water washing time of longer than 10 seconds only deteriorates the productivity in terms of industrial production because the thickening of Mn on the surface layer is already sufficient.

Note that the above water washing time is preferably 3 seconds or longer and more preferably 4 seconds or longer. The water washing time of 3 seconds or longer enables more surely the separation by 2 nm or more between the depth position A where the element concentration of Mn existing as the manganese oxide is maximum and the depth position B where the element concentration of Zr existing as the zirconium oxide is maximum. Further, the water washing time of 4 seconds or longer enables more surely the separation by 4 nm or more between the depth position A where the element concentration of Mn existing as the manganese oxide is maximum and the depth position B where the element concentration of Zr existing as the zirconium oxide is maximum without decreasing the yield.

Further, the water washing time is preferably 8 seconds or shorter and particularly preferably 6 seconds or shorter. The water washing time of 8 seconds or shorter enables more surely the separation by 2 nm or more between the depth position A where the element concentration of Mn existing as the manganese oxide is maximum and the depth position B where the element concentration of Zr existing as the zirconium oxide is maximum. Further, the water washing time of 6 seconds or shorter enables more surely the separation by 4 nm or more between the depth position A where the element concentration of Mn existing as the manganese oxide is maximum and the depth position B where the element concentration of Zr existing as the zirconium oxide is maximum without decreasing the yield.

The method of forming the coating layer by the cathode electrolytic treatment or immersion treatment in one stage has been explained above. However, the method of forming the coating layer in the present invention is not limited to the above method but the coating layer is preferably formed by the cathode electrolytic treatment in multiple stages.

For example, this step preferably has (a) a first treatment of immersing the Sn-based plated steel sheet in a first bath containing zirconium ions or performing the cathode electrolytic treatment for the Sn-based plated steel sheet in the first bath, and then (b) a second treatment of immersing the Sn-based plated steel sheet in a second bath containing manganese ions or performing the cathode electrolytic treatment for the Sn-based plated steel sheet in the second bath.

This can realize the coating layer having an abundance ratio of the zirconium oxide to the manganese oxide on the surface of 0 to 0.01 on a mass basis when analyzing the coating layer in the depth direction by the X-ray photoelectron spectroscopy. In other words, a layer mainly made of the zirconium oxide can be formed near the Sn-based plating layer in the first treatment, and a layer mainly made of the manganese oxide can be formed on the layer mainly made of the zirconium oxide in the second treatment. Since the coating layer has a structure in which the film containing the zirconium oxide and the film containing the manganese oxide are layered, the production of the zirconium oxide on the surface of the coating layer is prevented and the coating layer is structured to be covered with a coating having high barrier property made of the manganese oxide. In other words, in the coating layer, the concentration gradients of the zirconium oxide and the manganese oxide occur in the thickness direction. Accordingly, the combination of the first treatment and the second treatment as above enables the formation of the coating layer in which the manganese oxide and the zirconium oxide exist more in this order from the surface side of the coating layer, in the coating layer containing the zirconium oxide and the manganese oxide.

Further, performing the cathode electrolytic treatment in multiple stages makes the coating layer have a structure in which the film containing the zirconium oxide and the film containing the manganese oxide are layered. This enables more surely the separation by 4 nm or more between the depth position A where the element concentration of Mn existing as the manganese oxide is maximum and the depth position B where the element concentration of Zr existing as the zirconium oxide is maximum, in the thickness direction of the coating layer.

In the first treatment, the concentration of zirconium ions in the first bath (first cathode electrolytic solution) containing zirconium ions to be used only needs to be appropriately adjusted according to the production facility, the production rate (ability), and so on. For example, the zirconium ion concentration is preferably 100 ppm or more and 4000 ppm or less.

Further, the first bath preferably contains no manganese ions or has a low content of manganese ions in order to increase the concentration of the zirconium oxide in the coating layer to be formed. Specifically, the manganese ion concentration in the first bath is preferably 10 ppm or less.

The explanation of other components in the first bath and the various conditions of the first treatment will be omitted because they can be made the same as those of the above-explained cathode electrolytic treatment.

In the second treatment, the concentration of manganese ions in the second bath (second cathode electrolytic solution) containing manganese ions to be used only needs to be appropriately adjusted according to the production facility, the production rate (ability), and so on. The concentration of the manganese ions is preferably 30 ppm or more and 10000 ppm or less.

Further, the second bath preferably contains no zirconium ions or has a low content of zirconium ions in order to increase the concentration of the manganese oxide in the coating layer to be formed. Specifically, the zirconium ion concentration in the second bath is preferably 100 ppm or less.

The explanation of other components in the second bath and the various conditions of the second treatment will be omitted because they can be made the same as those of the above-explained cathode electrolytic treatment. Further, after each of the first treatment and the second treatment, the water washing treatment may be performed.

The Sn-based plated steel sheet according to this embodiment can be manufactured as above. Note that after each of the steps, well-known treatments such as cleaning and the like may be performed as needed.

EXAMPLES

Next, the Sn-based plated steel sheet according to the present invention will be concretely explained while illustrating examples. Note that the following examples are merely examples of the Sn-based plated steel sheet according to the present invention, and the Sn-based plated steel sheet according to the present invention is not limited to the following examples.

<1. Method for Producing a Test Material>

A standard method for producing a test material will be explained. Note that later-explained test materials in examples were produced according to the method for producing a test material.

First, a low-carbon cold-rolled steel sheet with a sheet thickness of 0.2 mm was subjected to electrolytic alkali degreasing, water washing, dilute sulfuric acid immersion pickling, and water washing as pretreatments, then subjected to Sn-based electroplating using a phenolsulfonic acid bath, and then subjected to a heating and melting treatment. Through these treatments, the Sn-based plating layers were formed on both surfaces of the steel sheet. The adhesion amount of the Sn-based plating layer was set to about 2.8 g/m$^2$ per side as a standard. The adhesion amount of the Sn-based plating layer was adjusted by changing the energization time.

Next, the steel sheet on which the Sn-based plating layers were formed was subjected to a cathode electrolytic treatment in an aqueous solution (cathode electrolytic solution) containing zirconium fluoride and manganese nitrate, whereby a coating layer containing a zirconium oxide and a manganese oxide was formed on the surface of the Sn-based plating layer. The solution temperature of the cathode electrolytic solution was set to 35° C., the pH of the cathode electrolytic solution was adjusted to be 3.0 or higher and 5.0 or lower, and the current density and the cathode electrolytic treatment time of the cathode electrolytic treatment were appropriately adjusted according to the content (metal Zr amount) of the zirconium oxide in the target coating layer.

<2. Evaluation Method>

The Sn-based plating layer produced as above was subjected to the following various evaluations.

[Adhesion Amount Per Side of the Sn-Based Plating Layer (Metal Sn Amount in the Sn-Based Plating Layer)]

An adhesion amount per side of the Sn-based plating layer (metal Sn amount in the Sn-based plating layer) was measured as follows. Test pieces of a plurality of steel sheets with Sn-based plating layers whose contents of metal Sn are known are prepared. Next, for each of the test pieces, the intensity of the X-ray fluorescence derived from metal Sn is measured in advance from the surface of the Sn-based plating layer of the test piece by an X-ray fluorescence spectrometer (ZSX Primus manufactured by Rigaku Corporation). Further, the calibration curve indicating the relation between the measured intensity of X-ray fluorescence and the metal Sn amount is prepared in advance. Then, the coating layer is removed from the Sn-based plated steel sheet which is a measurement object to prepare a test piece on which no coating layer is formed and the Sn-based plating layer is exposed. The surface where the Sn-based plating layer is exposed is subjected to measurement of the intensity of the X-ray fluorescence derived from the metal Sn by the X-ray fluorescence apparatus. The obtained X-ray fluorescence intensity and the calibration curve prepared in advance were used to calculate the adhesion amount per side of the Sn-based plating layer (namely, the content of metal Sn).

Note that the measurement conditions were an X-ray source of Rh, a tube voltage of 50 kV, a tube current of 60 mA, a dispersive crystal of LiF1, and a measurement diameter of 30 mm.

[Presence Form of Zirconium and Manganese in the Coating Layer]

To confirm that Zr and Mn in the coating layer exist as a zirconium oxide and a manganese oxide respectively, the surface of the coating layer was subjected to measurement by XPS (PHI Quantera SXM manufactured by ULVAC-PHI) to investigate the peak positions of bond energies of Zr 3d5/2 of the zirconium oxide and Mn 2p3/2 in the coating layer. The measurement conditions were an X-ray source of mono-AlKα ray (hv=1466.6 eV, 100.8 W), an X-ray diameter of 100 μmϕ, a detection depth of several nanometers (extraction angle of 45°), and an analysis range of 1400×100 μm. Then, it was defined that if the peak position of a binding energy of Zr 3d5/2 was a position separated by 3.0 eV or more and 4.0 eV or less to the high energy side from the peak position (=484.9 eV) of the binding energy of metal Zr, zirconium existed as a zirconium oxide. Besides, it was defined that if the peak position of a binding energy of Mn 2p3/2 was a position separated by 1.5 eV or more and 3.5 eV or less to the high energy side from the peak position of the binding energy of metal Mn, manganese existed as an oxide.

[Content of the Zirconium Oxide (Metal Zr Amount) in the Coating Layer]

The content of the zirconium oxide (metal Zr amount) in the coating layer was measured according to the measurement method of the adhesion amount per side of the Sn-based plating layer (metal Sn amount in the Sn-based plating layer). In short, the test piece of the Sn-based plated steel sheet which is a measurement object is prepared. The surface of the coating layer of the test piece is subjected to measurement of the intensity of the X-ray fluorescence derived from metal Zr by the X-ray fluorescence spectrometer (ZSX Primus manufactured by Rigaku Corporation). The obtained X-ray fluorescence intensity and the calibration curve regarding metal Zr prepared in advance were used to calculate the content of the zirconium oxide (metal Zr amount) in the coating layer.

[Content of the Manganese Oxide (Metal Mn Amount) in the Coating Layer]

The content of the manganese oxide (metal Mn amount) in the coating layer was measured according to the measurement method of the adhesion amount per side of the Sn-based plating layer (metal Sn amount in the Sn-based plating layer). In short, the test piece of the Sn-based plated steel sheet which is a measurement object is prepared. The surface of the coating layer of the test piece is subjected to measurement of the intensity of the X-ray fluorescence derived from metal Mn by the X-ray fluorescence spectrometer (ZSX Primus manufactured by Rigaku Corporation). The obtained X-ray fluorescence intensity and the calibration curve regarding metal Zr prepared in advance were used to calculate the content of the manganese oxide (metal Mn amount) in the coating layer.

[Distributions of the Zirconium Oxide and the Manganese Oxide in the Coating Layer]

The distributions of the zirconium oxide and the manganese oxide in the coating layer were measured by XPS (PHI Quantera SXM manufactured by ULVAC-PHI). Specifically, the test piece of the Sn-based plated steel sheet which is a measurement object is prepared. The analysis in the thickness direction (depth direction) by XPS (PHI Quantera SXM manufactured by ULVAC-PHI) was carried out from the surface of the coating layer of the test piece to find element concentrations of the oxides and the metals so that the total of element concentrations of Sn existing as tin oxide, Sn existing as metal Sn, Zr existing as zirconium oxide, Zr existing as metal Zr, Mn existing as manganese oxide, and Mn existing as metal Mn became 100%.

Note that the measurement conditions were an X-ray source of mono-AlKα ray (hv=1466.6 eV, 100.8 W), an X-ray diameter of 100 μmϕ, a detection depth of several nanometers (extraction angle of 45°), an analysis range of 1400×100 μm, a neutralization gun of 1.0 V and 20 μA, a sputter condition of Ar+, an acceleration voltage of 1 kV, and a sputter rate of 1.5 nm/min (value in terms of $SiO_2$). The case where the peak position where the detection intensity of the manganese oxide was maximum existed on the side closer to the surface of the coating layer by 4 nm or more than the peak position where the detection intensity of the zirconium oxide was maximum in the above XPS measurement was described as "A", the case of existing on the side closer to the surface of the coating layer by 2 nm or more and less than 4 nm was described as "B", and the other case was described as "C".

[Yellowing Resistance]

The test material of the Sn-based plated steel sheet was evaluated by performing a humidity cabinet test of placing it in a thermo-hygrostat kept at 40° C. and a relative humidity of 80% for 4 weeks and finding a change amount Δb* of a color difference b* value before and after the humidity cabinet test. When Δb* was 1 or less, the evaluation was "A", when it was more than 1 and 2 or less, the evaluation was "B", when it was more than 2 and 3 or less, the evaluation was "C", and when it was more than 3, the evaluation was "NG". The evaluations "A", "B" and "C" were regarded as being acceptable. The b* was measured using SC-GV5 manufactured by Suga Test Instruments Co., Ltd. as a commercially available colorimeter. The measurement conditions of b* are a light source of C, total reflection, and a measurement diameter of 30 mm.

[Coating Film Adhesiveness]

The coating film adhesiveness was evaluated as follows.

The test material of the Sn-based plated steel sheet was subjected to the humidity cabinet test by the method described in [Yellowing resistance], and then 7 g/m² on a dry mass basis of a commercially available epoxy resin paint for can was applied to its surface, baked at 200° C. for 10 minutes, and placed at room temperatures for 24 hours. Then, flaws reaching the steel sheet surface were formed in a grid form in the obtained Sn-based plated steel sheet (7 flaws in each of vertical and horizontal directions at an interval of 3 mm), and the portion was subjected to a tape peel test for evaluation. When the coating film at the tape stuck portion was not peeled at all, the evaluation was "A", when peeling of the coating film around the flaws in the grid form was found, the evaluation was "B", and when peeling of the coating film in squares of the grid form was found, the evaluation was "NG". The evaluations "A" and "B" were regarded as being acceptable.

[Sulfurization Blackening Resistance]

The sulfurization blackening resistance was evaluated as follows.

7 g/m² on a dry mass basis of the commercially available epoxy resin paint for can was applied to the surface of the test material of the Sn-based plated steel sheet produced and subjected to the humidity cabinet test in the method described in the above [Yellowing resistance], then baked at 200° C. for 10 minutes, and placed at room temperatures for 24 hours. Then, the obtained Sn-based plated steel sheet was cut into a predetermined size and immersed in an aqueous solution composed of 0.3% of sodium dihydrogen phosphate, 0.7% of sodium hydrogenphosphate, and 0.6% of L-cysteine hydrochloride, subjected to a retort treatment at 121° C. for 60 minutes in a sealed container, and evaluated from the external appearance after the test. When any change in external appearance was not recognized at all before and after the test, the evaluation was "A", when slight blackening (10% or less) was recognized, the evaluation was "B", and when blackening was recognized in a region of more than 10% of a test surface, the evaluation was "NG". The evaluations "A" and "B" were regarded as being acceptable.

[Post-Coating Corrosion Resistance]

The post-coating corrosion resistance was evaluated as follows.

7 g/m² on a dry mass basis of the commercially available epoxy resin paint for can was applied to the surface of the test material of the Sn-based plated steel sheet produced and subjected to the humidity cabinet test in the method described in the above [Yellowing resistance], then baked at 200° C. for 10 minutes, and placed at room temperatures for 24 hours. Then, the obtained Sn-based plated steel sheet was cut into a predetermined size and immersed in commercially available tomato juice at 60° C. for 7 days, and then the presence or absence of occurrence of rust was visually evaluated. When any rust was not recognized at all, the evaluation was "A", when rust was recognized in an area ratio of 10% or less of the whole test surface, the evaluation was "B", and when rust was recognized in an area ratio of more than 10% of the whole test surface, the evaluation was "NG". The evaluations "A" and "B" were regarded as being acceptable.

3. Example 1

Sn-based plated steel sheets were manufactured while changing the adhesion amounts of the zirconium oxide and the manganese oxide based on the method described in the above <1. Method for producing a test material>.

The Sn plating was produced by an electrolytic method from a publicly-known ferrostan bath. The energization amount in electrolysis was changed so that the Sn adhesion amount was in a range of 0.05 g/m² or more and 20 g/m². Further, both test pieces subjected to and not subjected to the heating and melting treatment after the Sn plating were produced.

For forming the coating containing the zirconium oxide and the manganese oxide on the Sn plating surface, the Sn-based plated steel sheets were subjected to cathode electrolysis in an aqueous solution in which the zirconium ion concentration was 50 ppm or more and 5000 ppm or less and the manganese ion concentration was 3.5 ppm or more and 12500 ppm or less, whereby various coating layers containing the zirconium oxide and the manganese oxide were formed on the Sn-based plated steel sheets. The pH of the treatment solution for forming the coating was 3.8, the solution temperature was 35° C., and the energization amount was appropriately changed. Further, the immersion water washing time after the cathode electrolytic treatment was changed from 1 to 10 seconds.

Thus, test pieces of the Sn-based plated steel sheets according to A1 to A25 and a1 to a7 were obtained in which the adhesion amounts of the zirconium oxide and the manganese oxide were changed. In any of the test pieces, it was confirmed that zirconium and manganese contained in the coating were the zirconium oxide and the manganese oxide respectively specified in the present invention.

The evaluation results of various performances made on the above test pieces are listed in Table 1.

TABLE 1

| | | COATING LAYER | | | | | MANUFACTURING METHOD | |
|---|---|---|---|---|---|---|---|---|
| | No. | Sn-BASED PLATING ADHESION AMOUNT PER SIDE (g/m²) | Zr OXIDE AMOUNT (AMOUNT IN TERMS OF METAL Zr) (mg/m²) | Mn OXIDE AMOUNT (AMOUNT IN TERMS OF METAL Mn) (mg/m²) | METAL Mn AMOUNT/ METAL Zr AMOUNT | DISTRI- BUTIONS OF Zr OXIDE AND Mn OXIDE IN COATING LAYER | NUMBER OF TIMES OF CATHODE ELECTROLYTIC TREATMENT | WATER WASHING TIME AFTER CATHODE ELECTROLYTIC TREATMENT (s) |
| INVENTION EXAMPLE | A1 | 0.10 | 5.00 | 0.50 | 0.10 | B | 1 | 3 |
| | A2 | 2.20 | 5.00 | 0.50 | 0.10 | B | 1 | 3 |
| | A3 | 11.00 | 5.00 | 0.50 | 0.10 | B | 1 | 3 |
| | A4 | 15.00 | 5.00 | 0.50 | 0.10 | B | 1 | 3 |
| | A5 | 2.80 | 0.20 | 0.10 | 0.50 | B | 1 | 3 |
| | A6 | 2.80 | 1.00 | 0.10 | 0.10 | B | 1 | 3 |

TABLE 1-continued

|  | No. |  |  |  |  |  |  |
|---|---|---|---|---|---|---|---|
|  | A7 | 2.80 | 2.00 | 0.20 | 0.10 | B | 1 | 2 |
|  | A8 | 2.80 | 5.00 | 0.50 | 0.10 | B | 1 | 2 |
|  | A9 | 2.80 | 10.00 | 1.00 | 0.10 | B | 1 | 3 |
|  | A10 | 2.80 | 30.00 | 3.00 | 0.10 | B | 1 | 3 |
|  | A11 | 2.80 | 50.00 | 5.00 | 0.10 | B | 1 | 3 |
|  | A12 | 2.80 | 5.00 | 0.10 | 0.02 | B | 1 | 3 |
|  | A13 | 2.80 | 5.00 | 0.30 | 0.06 | B | 1 | 3 |
|  | A14 | 2.80 | 5.00 | 0.50 | 0.10 | B | 1 | 3 |
|  | A15 | 2.80 | 5.00 | 1.00 | 0.20 | B | 1 | 3 |
|  | A16 | 2.80 | 5.00 | 2.00 | 0.40 | B | 1 | 3 |
|  | A17 | 2.80 | 5.00 | 2.50 | 0.50 | B | 1 | 3 |
|  | A18 | 2.80 | 3.00 | 0.30 | 0.10 | B | 1 | 3 |
|  | A19 | 2.80 | 6.00 | 0.60 | 0.10 | B | 1 | 3 |
|  | A20 | 2.80 | 3.00 | 0.30 | 0.10 | B | 1 | 3 |
|  | A21 | 2.80 | 6.00 | 0.60 | 0.10 | B | 1 | 3 |
|  | A22 | 2.80 | 5.00 | 0.10 | 0.02 | A | 1 | 4 |
|  | A23 | 2.80 | 5.00 | 1.00 | 0.20 | A | 1 | 4 |
|  | A24 | 2.80 | 5.00 | 0.10 | 0.02 | A | 1 | 8 |
|  | A25 | 2.80 | 5.00 | 0.10 | 0.02 | A | 1 | 10 |
| COMPARATIVE EXAMPLE | a1 | 0.05 | 5.00 | 0.50 | 0.10 | B | 1 | 3 |
|  | a2 | 20.00 | 5.00 | 0.50 | 0.10 | B | 1 | 3 |
|  | a3 | 2.80 | 0.10 | 0.00 | 0.00 | B | 1 | 4 |
|  | a4 | 2.80 | 60.00 | 6.00 | 0.10 | B | 1 | 3 |
|  | a5 | 2.80 | 30.00 | 0.10 | 0.00 | B | 1 | 2 |
|  | a6 | 2.80 | 10.00 | 7.00 | 0.70 | B | 1 | 3 |
|  | a7 | 2.80 | 5.00 | 0.50 | 0.10 | C | 1 | 1 |

| | | PROPERTY EVALUATION | | | | | | | |
|---|---|---|---|---|---|---|---|---|---|
| | | COLOR DIFFERENCE b* | | | YEL- LOWING RESIS- TANCE | COATING FILM ADHE- SIVENESS | SULFU- RIZATION BLACK- ENING RESIS- TANCE | POST- COATING CORRO- SION RESIS- TANCE | REMARKS |
| | No. | INITIAL | AFTER LAPSE OF TIME | Δb* | | | | | |
| INVENTION EXAMPLE | A1 | 2.0 | 2.2 | 0.2 | A | A | B | B | |
| | A2 | 2.1 | 2.4 | 0.3 | A | A | A | A | |
| | A3 | 2.8 | 3.2 | 0.4 | A | A | A | A | |
| | A4 | 2.9 | 3.3 | 0.4 | A | B | B | A | |
| | A5 | 2.6 | 3.6 | 1.0 | A | B | B | B | |
| | A6 | 2.6 | 3.5 | 0.9 | A | B | B | A | |
| | A7 | 2.5 | 3.4 | 0.9 | A | A | A | A | |
| | A8 | 2.6 | 3.1 | 0.5 | A | A | A | A | |
| | A9 | 2.8 | 3.0 | 0.2 | A | A | A | A | |
| | A10 | 3.0 | 5.5 | 2.5 | C | B | A | A | |
| | A11 | 3.1 | 5.4 | 2.3 | C | B | A | A | |
| | A12 | 2.6 | 5.0 | 2.4 | C | B | B | A | |
| | A13 | 2.6 | 4.0 | 1.4 | B | A | B | A | |
| | A14 | 2.5 | 3.3 | 0.8 | A | A | A | A | |
| | A15 | 2.6 | 3.2 | 0.6 | A | A | A | A | |
| | A16 | 2.5 | 3.0 | 0.5 | A | A | A | A | |
| | A17 | 2.6 | 2.9 | 0.3 | A | A | A | A | |
| | A18 | 2.9 | 3.3 | 0.4 | A | B | B | B | WITHOUT HEATING AND MELTING TREATMENT AFTER Sn PLATING |
| | A19 | 3.1 | 3.5 | 0.4 | A | B | B | B | |
| | A20 | 2.9 | 3.4 | 0.5 | A | B | B | B | |
| | A21 | 3.1 | 3.5 | 0.4 | A | B | B | B | |
| | A22 | 2.7 | 3.6 | 0.9 | A | A | A | A | |
| | A23 | 2.7 | 2.9 | 0.2 | A | A | A | A | |
| | A24 | 2.8 | 3.4 | 0.6 | A | A | A | A | |
| | A25 | 2.9 | 3.0 | 0.1 | A | A | A | A | |
| COMPARATIVE EXAMPLE | a1 | 1.9 | 2.2 | 0.3 | A | A | B | NG | |
| | a2 | 3.1 | 5.4 | 2.3 | C | NG | B | A | |
| | a3 | 2.7 | 6.2 | 3.5 | NG | NG | NG | B | |
| | a4 | 3.6 | 5.1 | 1.5 | B | NG | A | A | |
| | a5 | 2.6 | 5.8 | 3.2 | NG | NG | NG | A | |
| | a6 | 2.6 | 2.9 | 0.3 | A | NG | A | A | |
| | a7 | 3.4 | 6.5 | 3.1 | NG | A | NG | A | |

It is found from Table 1 that each of the Sn-based plated steel sheets of A1 to A25 according to the present invention is excellent in all of performances. In particular, when the Sn plating adhesion amount, the Zr oxide amount, and the manganese oxide amount are within preferable ranges, the Sn-based plated steels are more excellent in performances. It is found that, on the other hand, a1 to a7 which are comparative examples are inferior in any of the yellowing resistance, the coating film adhesiveness, the sulfurization blackening resistance, and the post-coating corrosion resistance.

4. Example 2

Next, Sn-based plated steel sheets were manufactured while changing the distributions of the zirconium oxide and the manganese oxide in the coating layer based on the method described in the above <1. Method for producing a test material>.

The Sn plating was produced by an electrolytic method from a publicly-known ferrostan bath so that the Sn adhesion amount was 2.8 g/m$^2$.

Thereafter, the Sn-based plated steel sheets were subjected to cathode electrolysis (first treatment) in an aqueous solution containing no manganese ions but containing zirconium ions, then water washing for water washing times listed in the following Table 2, and cathode electrolysis (second treatment) in an aqueous solution containing no zirconium ions but containing manganese ions, whereby test pieces B1 to B6 were produced. Further, a test piece B7 was produced by performing cathode electrolysis in an aqueous solution containing zirconium ions and manganese ions and water washing for a water washing time listed in the following Table 2 similarly to Example 1.

Thus, test pieces of the Sn-based plated steel sheets according to B1 to B7 were obtained in which the distributions of the zirconium oxide and the manganese oxide in the coating layers were changed.

The distributions of the zirconium oxide and the manganese oxide in the coating layers in the produced test pieces were measured by XPS (PHI Quantera SXM manufactured by ULVAC-PHI). Specifically, the test piece of the Sn-based plated steel sheet which is a measurement object is prepared. The analysis in the thickness direction (depth direction) by XPS (PHI Quantera SXM manufactured by ULVAC-PHI) was carried out from the surface of the coating layer of the test piece to find element concentrations of the oxides and the metals so that the total of element concentrations of Sn existing as tin oxide, Sn existing as metal Sn, Zr existing as zirconium oxide, Zr existing as metal Zr, Mn existing as manganese oxide, and Mn existing as metal Mn became 100%.

The case where the peak position where the detection intensity of the manganese oxide was maximum existed on the side closer to the surface of the coating layer by 4 nm or more than the peak position where the detection intensity of the zirconium oxide was maximum in the above XPS measurement was regarded "A", the case of existing on the side closer to the surface of the coating layer by 2 nm or more and less than 4 nm was regarded as "B", and the other case was regarded as "C".

Further, the case where the abundance ratio of the zirconium oxide to the manganese oxide in the outermost layer was 0 to 0.01 on a mass basis was regarded as "A" and the other case was regarded as "B".

Besides, the measurement conditions were an X-ray source of mono-AlKα ray (hv=1466.6 eV, 100.8 W), an X-ray diameter of 100 μmφ, a detection depth of several nanometers (extraction angle of 45°), an analysis range of 1400×100 μm, a neutralization gun of 1.0 V and 20 μA, a sputter condition of Ar+, an acceleration voltage of 1 kV, and a sputter rate of 1.5 nm/min (value in terms of SiO$_2$).

The evaluation results of various performances made on the above test pieces are listed in Table 2.

TABLE 2

| | | | COATING LAYER | | | | |
|---|---|---|---|---|---|---|---|
| | No. | Sn-BASED PLATING ADHESION AMOUNT PER SIDE (g/m$^2$) | Zr OXIDE AMOUNT (AMOUNT IN TERMS OF METAL Zr) (mg/m$^2$) | Mn OXIDE AMOUNT (AMOUNT IN TERMS OF METAL Mn) (mg/m$^2$) | METAL Mn AMOUNT/ METAL Zr AMOUNT | DISTRIBUTIONS OF Zr OXIDE AND Mn OXIDE IN COATING LAYER | ABUNDANCE RATIO OF Zr OXIDE TO Mn OXIDE ON SURFACE |
| INVENTION EXAMPLE | B1 | 2.80 | 2.00 | 0.20 | 0.10 | B | A |
| | B2 | 2.80 | 5.00 | 0.40 | 0.08 | B | A |
| | B3 | 2.80 | 8.00 | 0.60 | 0.08 | B | A |
| | B4 | 8.40 | 3.00 | 0.20 | 0.07 | B | A |
| | B5 | 8.40 | 6.00 | 0.50 | 0.08 | B | A |
| | B6 | 8.40 | 9.00 | 0.70 | 0.08 | B | A |
| | B7 | 2.80 | 2.00 | 0.20 | 0.10 | B | B |

| | | MANUFACTURING METHOD | | PROPERTY EVALUATION | | | |
|---|---|---|---|---|---|---|---|
| | | | | COLOR DIFFERENCE b* | | | |
| | No. | NUMBER OF TIMES OF CATHODE ELECTROLYTIC TREATMENT | WATER WASHING TIME AFTER CATHODE ELECTROLYTIC TREATMENT (s) | INITIAL | AFTER LAPSE OF TIME | Δb* | YELLOWING RESISTANCE |
| INVENTION EXAMPLE | B1 | 2 | 2 | 2.5 | 2.8 | 0.3 | A |
| | B2 | 2 | 2 | 2.7 | 2.8 | 0.1 | A |
| | B3 | 2 | 2 | 3.1 | 3.2 | 0.1 | A |

TABLE 2-continued

| | No. | | | | | | |
|---|---|---|---|---|---|---|---|
| | B4 | 2 | 2 | 2.6 | 2.7 | 0.1 | A |
| | B5 | 2 | 2 | 3.0 | 3.1 | 0.1 | A |
| | B6 | 2 | 2 | 3.3 | 3.6 | 0.3 | A |
| | B7 | 1 | 2 | 2.5 | 3.6 | 1.1 | B |

| | No. | PROPERTY EVALUATION | | | |
|---|---|---|---|---|---|
| | | COATING FILM ADHESIVENESS | SULFURIZATION BLACKENING RESISTANCE | POST-COATING CORROSION RESISTANCE | REMARKS |
| INVENTION EXAMPLE | B1 | A | A | A | |
| | B2 | A | A | A | |
| | B3 | A | A | A | |
| | B4 | A | A | A | |
| | B5 | A | A | A | |
| | B6 | A | A | A | |
| | B7 | B | B | B | |

It is found from Table 2 that the case where the coating layer is formed by the two-time cathode electrolytic treatment (B1 to B6) is more excellent in yellowing resistance, coating film adhesiveness, sulfurization blackening resistance, and post-coating corrosion resistance than the case where the coating layer is formed by the one-time cathode electrolytic treatment (B7).

Preferred embodiments of the present invention have been described above in detail, but the present invention is not limited to the embodiments. It should be understood that various changes and modifications are readily apparent to those skilled in the art who has the common general knowledge in the technical field to which the present invention pertains, within the scope of the technical spirit as set forth in claims, and they should also be covered by the technical scope of the present invention.

INDUSTRIAL APPLICABILITY

As explained above, the Sn-based plated steel sheet according to the present invention is excellent in yellowing resistance, coating film adhesiveness, and sulfurization blackening resistance without requiring the conventional chromate treatment, and therefore can be widely used for a food can, a beverage can, and the like as an environment-friendly material for can and has an extremely high industrial utility value.

EXPLANATION OF CODES

1 Sn-based plated steel sheet
10 steel sheet
20 Sn-based plating layer
30 coating layer

The invention claimed is:

1. A Sn-based plated steel sheet comprising:
   a steel sheet;
   a Sn-based plating layer located on at least one surface of the steel sheet; and
   a coating layer located on the Sn-based plating layer, wherein:
   the Sn-based plating layer contains 0.10 g/m$^2$ or more and 15.00 g/m$^2$ or less of Sn per side in terms of metal Sn;
   the coating layer contains a zirconium oxide and a manganese oxide;
   a content of the zirconium oxide in the coating layer is 0.20 mg/m$^2$ or more and 50.00 mg/m$^2$ or less per side in terms of metal Zr;
   a content of the manganese oxide in terms of metal Mn in the coating layer is 0.01 times or more and 0.50 times or less on a mass basis relative to the content of the zirconium oxide in terms of metal Zr; and
   a depth position A where an element concentration of Mn existing as the manganese oxide is maximum is located on a side closer to a surface of the coating layer than a depth position B where an element concentration of Zr existing as the zirconium oxide is maximum, and a distance in a depth direction between the depth position A and the depth position B is 2 nm or more in an element analysis in the depth direction by X-ray photoelectron spectroscopy.

2. The Sn-based plated steel sheet according to claim 1, wherein
   a mass of the zirconium oxide in the element analysis in the depth direction by the X-ray photoelectron spectroscopy is 0.01 times or less a mass of the manganese oxide in the element analysis in the depth direction by the X-ray photoelectron spectroscopy on the surface of the coating layer.

3. The Sn-based plated steel sheet according to claim 1, wherein
   the distance in the depth direction between the depth position A and the depth position B is 4 nm or more.

4. The Sn-based plated steel sheet according to claim 1, wherein
   the content of the zirconium oxide in the coating layer is 1.00 mg/m$^2$ or more and 30.00 mg/m$^2$ or less per side in terms of metal Zr.

5. The Sn-based plated steel sheet according to claim 1, wherein
   the content of the zirconium oxide in the coating layer is 2.00 mg/m$^2$ or more and 10.00 mg/m$^2$ or less per side in terms of metal Zr.

6. The Sn-based plated steel sheet according to claim 1, wherein
   the content of the manganese oxide in terms of metal Mn in the coating layer is 0.05 times or more and 0.40 times or less on a mass basis relative to the content of the zirconium oxide in terms of metal Zr.

7. The Sn-based plated steel sheet according to claim 1, wherein the content of the manganese oxide in terms of metal Mn in the coating layer is 0.10 times or more and 0.20 times or less on a mass basis relative to the content of the zirconium oxide in terms of metal Zr.

* * * * *